May 3, 1966 M. K. PRICE ETAL 3,249,811
CONSTANT VOLTAGE SOURCE FOR OPERATION OF SERIES CAPACITOR
BANK PROTECTIVE EQUIPMENT
Filed Feb. 18, 1963 3 Sheets-Sheet 1

INVENTORS
MURRAY K. PRICE
BRIAN J. GILSON
BY
OSTROLENK, FABER, GERB & SOFFEN
ATTORNEYS

INVENTORS
MURRAY K. PRICE
BRIAN J. GILSON
BY
OSTROLENK, FABER, GERB & SOFFEN
ATTORNEYS

United States Patent Office 3,249,811
Patented May 3, 1966

3,249,811
CONSTANT VOLTAGE SOURCE FOR OPERATION OF SERIES CAPACITOR BANK PROTECTIVE EQUIPMENT
Murray K. Price, Downsview, Ontario, and Brian J. Gilson, Esindale, Ontario, Canada, assignors, by mesne assignments, to I-T-E Circuit Breaker (Canada) Limited, Port Credit, Ontario, Canada, a limited-liability company of Canada
Filed Feb. 18, 1963, Ser. No. 259,181
7 Claims. (Cl. 317—12)

This invention relates to a constant voltage source, and more particularly to such a source which is energizable from a high voltage alternating current power transmission line for the appropriate operation of series capacitor bank protective equipment associated with the transmission line. Advantageously a substantially constant potential within the range of 70–140 volts is maintained during variable line load conditions between 100 and 6,000 amperes. Our invention may, for example, furnish the control system source potential for the operation of a capacitor bank protective arrangement of the type shown in copending U.S. patent application Serial No. 259,238, filed on even date with the instant application, entitled "Rapid Reinsertion Protection System for Series Capacitor Bank," in the names of B. J. Gilson and M. K. Price, and assigned to the assignee of the instant application.

Series capacitor banks are used in alternating current power transmission lines to improve system operation by neutralizing the line reactance. That is, the power transmission lines themselves are known to be inductive. The existence of such line inductance disadvantageously effects the power factor, transport capacity, stability and voltage regulation of the line. This condition is especially severe in the long distance, extra-high voltage lines (as for example, 230 kv. lines) which are currently coming into more frequent use.

To balance out the inductive reactance of the line, it is known to insert capacitors in series along the line of a sufficient magnitude to compensate for all or part of the line reactance. The voltage appearing across such series capacitors will be directly proportional to load current, therefore subjecting a non-protected series capacitor unit to an excessive voltage during the occurrence of a line fault condition. Although such capacitor units are capable of withstanding moderate overloads for brief periods, they will be subjected to serious damage should the line current exceed its normal value by an extensive amount.

The volume and price of a capacitor generally increases with the square of its maximum current rating. It is therefore economically undesirable to use series capacitors rated greatly in excess of normal line currents. Accordingly, it has become the practice to use a bank of capacitors rated at substantially normal loads, and to provide a rapid bypassing arrangement for the capacitor bank responsive to the presence of excessive fault conditions. The bypass circuit preferably operates almost instantaneously upon the occurrence of a fault in excess of a predetermined level. Such instantaneous operation may be obtained, for example, by an appropriately designed spark gap device in shunt relationship with the capacitor bank.

During the period in which the series capacitor bank is bypassed from the series line, it is effectively removed from aiding to neutralize the inductive reactance of the line. Since the system stability provided by the capacitor bank is particularly important immediately following the clearing up of the fault condition, it is essential that the protective system operate to restore the capacitor to the line as rapidly as possible after the danger of capacitor damage has been dissipated by the clearing up of the fault. Accordingly, extensive auxiliary equipment is provided for rapidly restoring the capacitor to the line, thereby maximizing its effectiveness while still maintaining adequate protection of the capacitor bank against overload damage. The instant invention is directed to a novel source for the operation of such auxiliary control equipment.

Numerous series capacitor protective arrangements have been previously suggested to obtain such rapid restoration. One such arrangement utilizes an arc gap in the bypass circuit which is made self-clearing by means of an air blast continuously directed through the gap responsive to breakdown. The air blast is of sufficient strength to de-ionize the area between the arc electrodes, extinguishing the arc at every current zero after the arc is struck. Such extinguishment of the arc reinserts the capacitor bank in series with the transmission line. This arrangement disadvantageously requires the availability of a substantial source of compressed air to provide the continuous arc extinguishing blast. Another disadvantage of this arrangement is that since it normally takes a number of cycles for the fault to be cleared, the arc will restrike at half cycle intervals intermediate the current zeroes from the time the arc is initially extinguished to the clearing up of the fault condition. This repetitive restriking of the arc has been found to give rise to transient voltages of sufficient magnitude to harm the capacitor bank.

Another attempt which has been suggested is to interrupt the bypass circuit by various arrangements of fast operating electromagnetic relays and switches, arranged in the circuit to sense the presence or removal of the overload condition. As discussed in aforementioned copending U.S. patent application Serial No. 259,238, such systems are oftentimes relatively slow in resetting, should normal current continue to flow in the transmission line when the overload condition is removed. A particularly preferable control system is shown in that patent application, which includes a system coordinated electronic relay for the operation of a bypass circuit arrangement in shunt relationship with the spark gap. The bypass circuit includes the series arrangement of a normally opened and normally closed fast acting switch. The normally opened, or bypass disconnect switch, is rapidly closed responsive to the conduction of arc current. This provides a low impedance shunt path across the spark gap and capacitor bank out of the transmission line. The opening of the normally closed or bypass interrupter switch is effected by the electronic relay, which includes a sequentially related timing and overload sensing circuit, such as is the subject of copending U.S. patent application Serial No. 259,233, filed of even date with the instant application entitled "Overload Fast Release Relay" in the name of Murray K. Price and assigned to the assignee of the instant application.

The electrically controlled circuits advantageously avoid the need of an appreciable source of compressed air, which is both expensive and difficult to maintain at remote installation sites. These systems do, however, require a control system source potential of appreciably lesser magnitude than the voltage being transmitted in the main line; such a source usually being in the order of 110 or 220 volts. Some previous arrangements have supplied such a source from a separate supply, with individual supply lines being maintained between the capacitor bank control system platform and such auxiliary electrical source, usually located at the ground. Since the capacitor bank platform is usually elevated from the ground, considerable problems are presented in maintaining sufficient isolation between the auxiliary control source and the capacitor bank platform.

Accordingly, it is preferable to obtain the control system electrical source by directly tapping off the main line, thereby avoiding the above problems attendant with the use of an auxiliary source. It has been previously suggested to employ a potential transformer to effect such a power tap off from the main line to the auxiliary control potential. However, the use of conventional power transformers is extremely impractical in extra high voltage lines where it is necessary to go from a main line potential in the order of 230,000 volts down to 110 volts. The use of a potential transformer for this application would necessitate a considerable expenditure, probably in excess of $40,000.

Our invention avoids these disadvantages by providing a relatively simple and inexpensive arrangement whereby the energy in the main line is utilized to provide a relatively constant voltage supply for all of the auxiliary equipment with a minimum of expenditure of the components and circuitry required in the constant voltage unit. More particularly, our invention includes an appropriately designed current transformer having a core which saturates at the lowest level of current flow in the main power transmission line; i.e. 50–100 amperes. Upon saturation of the core the secondary coil output potential will be maintained at a relatively constant level corresponding to appreciable variations in primary energizing current. Hence, under conditions of widely varying line load corresponding to capacitor bank insertion during normal load conditions; capacitor bank removal during overload fault; and reinsertion of the capacitor bank, the output potential of the saturable core current transformer will remain at a comparatively constant level. For example, the voltage variation is preferably maintained within 70–140 volts corresponding to an appreciable line load range between 100–6,000 amperes.

As a further aspect of our invention, a filter circuit is provided intermediate the current transformer and the output terminals of the voltage unit. The low pass filter is appropriately designed to provide a good sinusoidal output (as, for example, 60 cycles) under conditions of severe distortion of the current transformer output.

Series capacitor banks are normally located at rather remote outdoor locations. Accordingly, as a further preferable aspect of our invention, the filter circuit includes temperature compensating components to maintain a substantially constant output voltage under varying extremes of ambient temperature. These temperature compensating components are preferably designed to operatively maintain the source potential corresponding to environmental variations of −40 to +40 degrees of centigrade.

It is therefore seen that the basic concept of our invention resides in the employment of an appropriately designed saturable core current transformer as a tap-off from a high voltage transmission line, to provide a substantially constant energy source in an economical and simplified manner.

Accordingly, a primary object of our invention is to provide a substantially constant source potential for a capacitor bank reinsertion system operative from the main transmission line.

A further object of our invention is to provide such a source potential which includes a saturable core current transformer appropriately designed to saturate at the lowest level of normal line current.

Another object of our invention is to provide an economical tap off arrangement from a high voltage power transmission line for effecting a substantially constant source during conditions of line load variations up to at least 50:1.

An additional object of our invention is to provide such an economical tap off arrangement which presents an output potential substantially within 70–140 volts corresponding to a variation in line load current of 100–6,000 amperes.

Still a further object of our invention is to provide a comparatively constant control system source potential via a saturable core current transformer tap off from a high power transmission line which further includes a low pass filter to appropriately modify the output wave form.

Still another object of our invention is to provide such a comparatively constant source including a saturable core current transformer and filter circuit, which includes temperature compensating components for maintaining output potential at appreciable variations in ambient temperature.

These as well as other objects of our invention will readily become apparent after reading the following descriptions of the accompanying drawings in which:

FIGURE 2A is a schematic diagram of the fast acting overload release of our invention.

Figure 4:
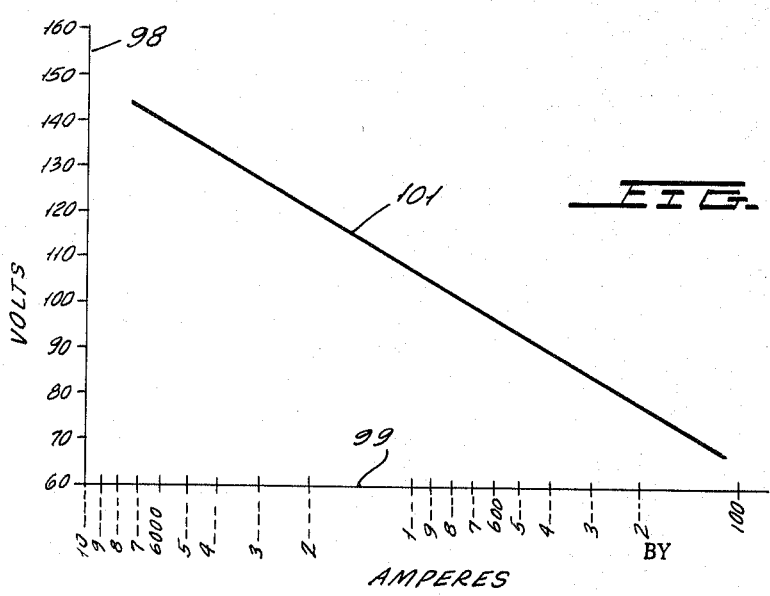

FIGURE 4 graphically illustrates the relationship between line load current and transformer output potential obtained by our invention, with the line current being logarithmically represented.

*Capacitor bank system operation*

To facilitate an understanding of our invention, and particularly the preferable manner in which it cooperates with the capacitor bank equipment, a discussion of an overall system of the type set forth in copending U.S. patent application Serial No. 259,238 is in order. It is to be understood that the instant invention is shown in conjunction with that system for illustrative purposes only, with its basic concepts being equally adaptable to other protective arrangements.

The figures for simplicity show only one phase of a power transmission system incorporating our rapid reinsertion protective arrangement. It is naturally understood that in actual practice three similar phases would ordinarily be employed, with each phase having a similar control system energized by the potential source of our invention. Also the actual three-phase system might preferably include interphase signalling means for operation of the individual phase protective circuitry in unison responsive to a fault condition in one of the phases. Such interphase signalling may, for example, take the form of motor actuated rotary columns formed of interrelated axial segments appropriately connected to the switching assemblies of the protective arrangement.

Figure 1:
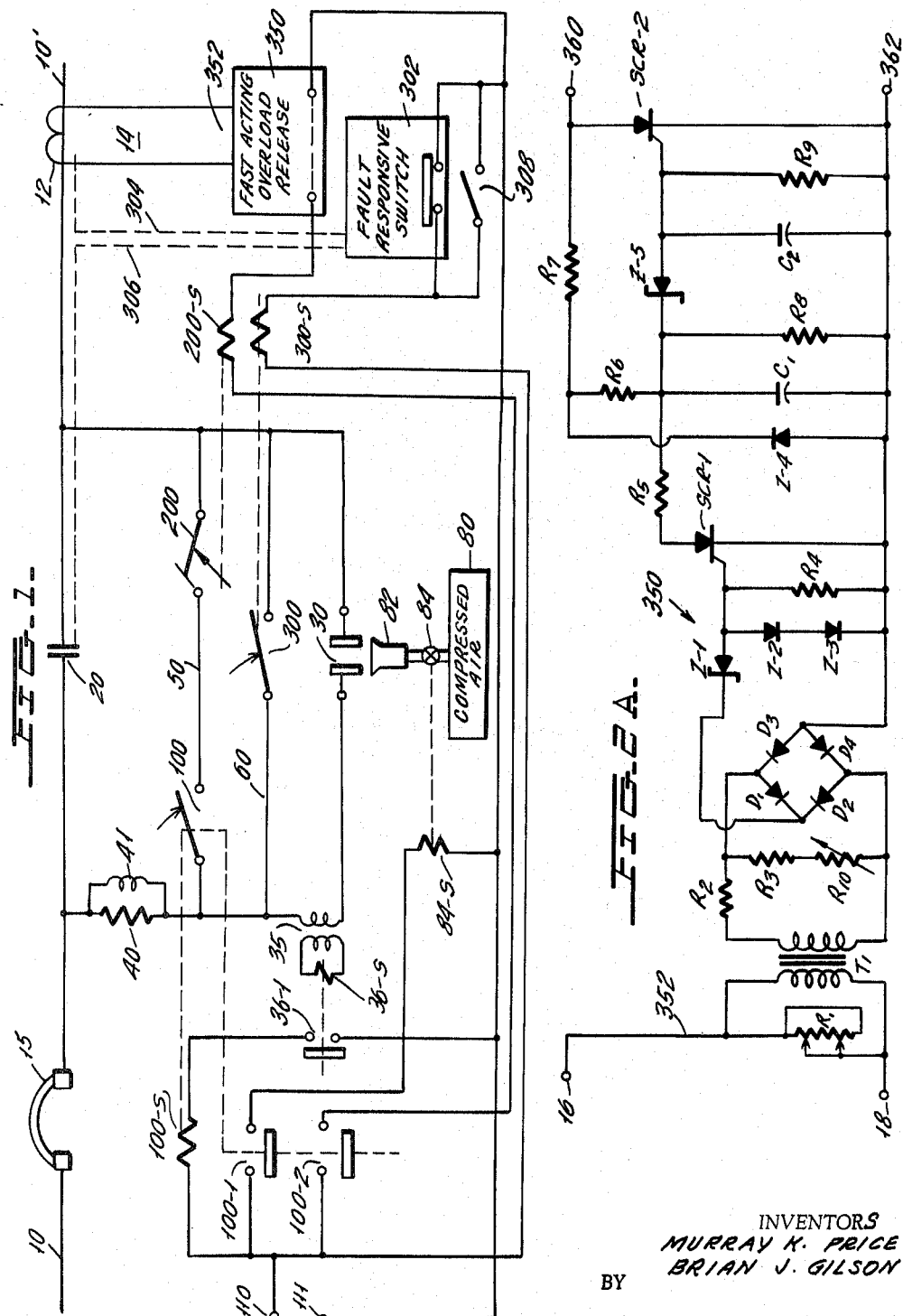
FIGURE 1 is a simplified schematic diagram illustrating the basic operation of a series capacitor protective arrangement constructed to include the overload release relay of our invention.

Referring to FIGURE 1 the line 10—10 is representative of one of the main transmission lines of a high voltage system, which may for example be a 230 kv. line. Series capacitor bank 20 is installed along the line for the purposes of balancing out the reactive impedance of the line, thereby improving the power factor, to effect an increase in power transport capacity of the line. Although capacitor 20 is diagrammatically shown as a single unit it normally consists of a fairly large installation including a number of individual units connected together in an appropriate series parallel arrangement to yield the necessary capacitive reactance and current rating.

Inasmuch as the interruption of a main line at the generator will cause severe power interruption, it is desirable to remove system faults by the proper operation of line breakers (not shown) situated towards the load end of the line. Accordingly, main transmission line circuit breaker 15 will usually be closed and line current will flow through capacitor bank 20. Upon the occurrence of a fault condition causing excessive currents to flow through line 10, 10', capacitor bank 20 is protected from overvoltages by means of spark gap assembly 30 connected in shunt relationship with respect to the capacitor bank. Spark gap 30 is of an appropriate design, such as of the type shown in copending U.S. patent application (C–1116 SWGR), filed Nov. 1, 1962, Serial No. 234,770, entitled Adjustable Precision Spark Gap, filed in the name of Otto Jensen, and assigned to the assignee of the instant invention, to break down and immediately become conducting when subjected to an instantaneous fault voltage, which would otherwise subject the capacitor bank 20 to serious damage. The parallel arrangement of resistor 40 and inductor 41 is preferably connected in series with the arc shunt circuit to limit the magnitude of the discharge current from capacitor bank 20 when the spark gap 30 initially breaks down, and to damp out oscillations of the capacitor discharge current.

Bypass series circuit 50 is provided in shunt relationship with respect to both capacitor bank 20 and spark gap 30. Bypass circuit 50 includes the series relationship of normally opened switch 100 and normally closed switch 200 which serves the purpose, as will be set forth below, of rapidly extinguishing the arc and reinserting the capacitor bank 20 back into the line responsive to the clearing up of the fault condition. Switches 100 and 200 are suitable fast acting devices, preferably of the spring motor charged variety, trip-biased to their other position and quickly operative responsive to the energization of trip-coil solenoids 100–s and 200–s, respectively. Actuating solenoid 100–s is connected to terminals 110, 111 of an appropriate energizing potential source, through the series circuit including contact pair 36–1. Contact pair 36–1 is controlled by output relay 36–s of current sensitive tap-off 35 responsive to the flow of arc gap current. The breakdown of arc-gap 30, accompanied by the flow of arc current, energizes 36–s to close contacts 36–1 and thereby complete the energizing path of actuating solenoid 100–s to close switch 100. The closing of switch 100 completes bypass circuit 50 which by providing a lower impedance path than that of arc gap device 30 serves to extinguish the arc gap.

Rapid restoration of capacitor bank 20 in series with the transmission line is provided by the subsequent opening of switch 200. Actuating solenoid 200–s is connected to energizing source terminals 110, 111 through the series circuit arrangement of fast acting overload release 350 and contacts 100–2, the latter being auxiliary contacts closed responsive to the closing of switch 100. The fast acting overload release 350 which constitutes the subject matter of the aforementioned copending U.S. patent application Serial No. 259,233, includes an input 352 connected to line current pick-off device 12 to be responsive to the clearing up of the overload condition. As fully set forth in that patent application fast acting overload release 350 is designed to operate in sufficient time from the clearing up of the fault condition to effect reinsertion of capacitor bank 20 into the transmission line 10–10' within ten cycles from the time the fault initially occurs. In some of the prior art arrangements the overload release consisted of an electromagnetic relay coil or an appropriate circuit arrangement of such relay coils energized by a source proportionally related to the overload condition. While such relays may be designed to reset in a fairly rapid manner when the coil current approaches zero, they have been found to be relatively slow setting where normal current remains on the line upon the removal of the fault condition, such as is the usual case in the main transmission line. The overload release relay preferably avoids this by being accurately responsive to the return of normal load.

The system of patent application Serial No. 259,238, also preferably includes a small source of compressed air 80, provided to a suitable outlet valve 82 positioned to emit a relatively short puff of air into the area enclosed by spark gap device 30. The emission of such air into the spark gap is controlled by valve 84, actuating solenoid 84–s of which is series connected to energizing source terminals 110, 111 through auxiliary contacts 100–1 controlled by the closing of bypass disconnect switch 100. Actuating coil 84–s is appropriately time delayed such that the compressed air is emitted into the spark gap 30 as a short puff after the arc therebetween is extinguished, and is for the sole purpose of removing the ionized gases from the spark gap. This operation is timed to occur prior to the opening of interrupter switch 200, thereby preventing restriking of the arc at lower than its adjusted value at such time as interrupter 200 is opened. It is to be noted that inasmuch as compressed air source 80 need only be used for a short interval to remove ionized gases after the arc is extinguished, it may be a substantially lesser source than that used in prior art arrangements wherein a compressed air source provides a strong blast of air for a sufficient duration to actually extinguish the arc.

The protective system may also include a lockout series circuit 60 in shunt relationship with the capacitor bank 20 and protective shunt circuits 30 and 50. Lockout series circuit 60 includes a normally opened fast acting disconnect switch 300, actuated by solenoid 300–s. Solenoid 300–s is series connected to energizing source terminals 110, 111 through a device 302 generally referred to as a fault responsive switch in FIGURE 1, and more fully shown in FIGURE 2. Fault responsive switch 302 may include one or more system fault sensing inputs shown generally as 304, 306 which operatively control fault responsive switch 302 to complete the actuating circuit of solenoid 300–s. As will subsequently be discussed in conjunction with FIGURE 2, fault responsive switch 302 may be operated by such fault conditions as: a serious current unbalance within the capacitor bank, overload during the bypass reset operation or a prolonged flow of spark gap current. A switch 308 is also shown connected in parallel across fault responsive switch 302. Switch 308 may be manually operable or operable by remote control to permit removal of the capacitor bank.

Figure 2:
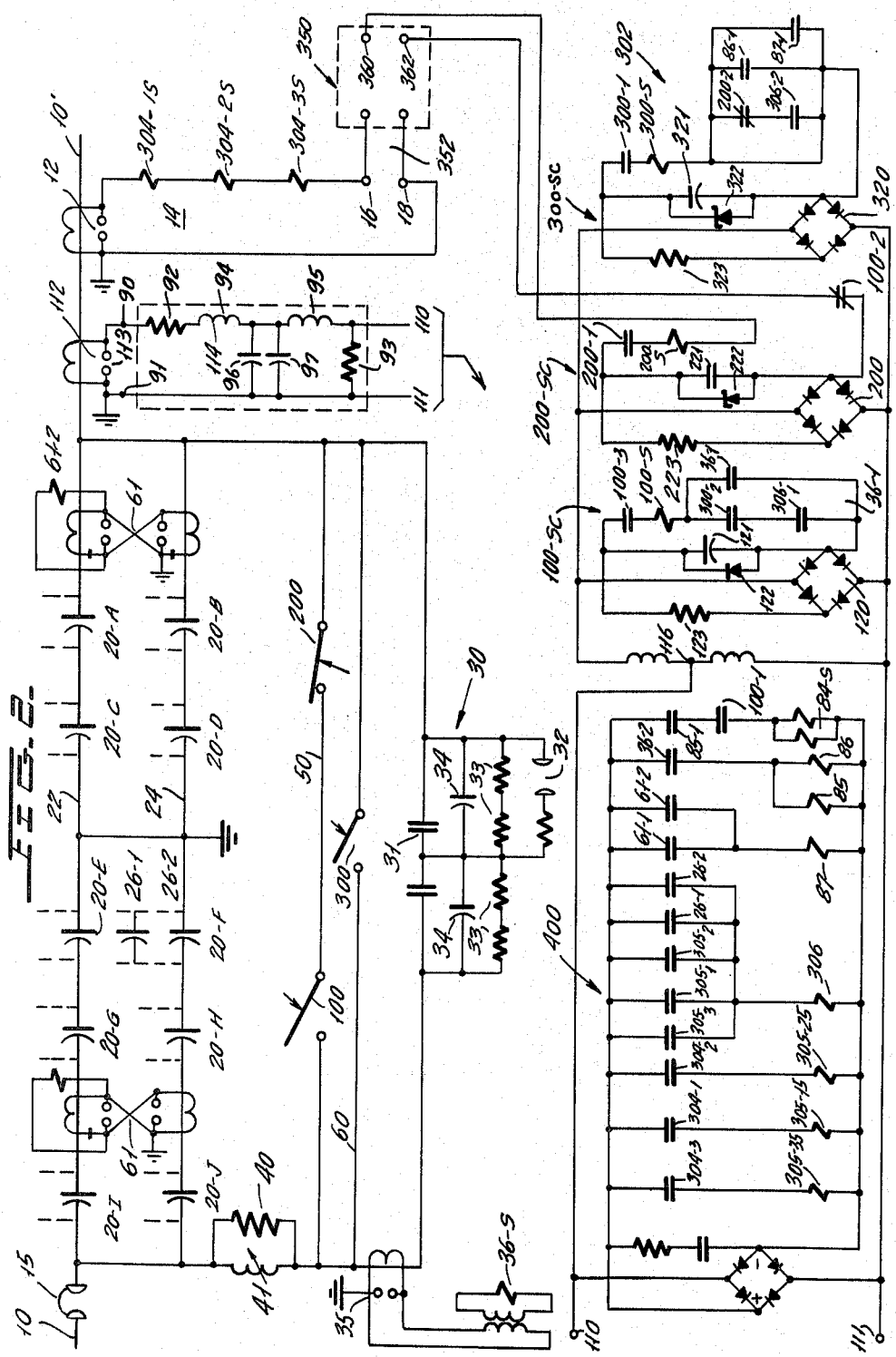
FIGURE 2 is a diagrammatic representation of a single phase of a high voltage distribution line system having a series capacitor installation protected in the manner of above-mentioned copending U.S. patent application Serial No. 259,238, and utilizing a preferred embodiment of the instant invention.

Reference is now made to FIGURE 2 which diagrammatically illustrates a capacitor bank protective arrangement located at one phase of a high voltage transmission line, and wherein like numerals have been used to indicate those components previously designated in FIGURE 1. Capacitor bank 20 is seen to comprise a plurality of individual capacitor racks 20–A—20–J, connected in a series parallel relationship. Line 10, 10' may typically be the main transmission line of a 230 kva. system, which would accordingly require a considerable number of individual capacitor units to provide the appropriate amount of neutralizing capacitive reactance. For increased economy and reduced space requirements, it has been found preferably to form the individual capacitor racks of primarily 100 kvar. capacitors, such as the 4160 volt units shown in FIGURES 5, 5A.

For increased capacitor protection, capacitor bank 20 preferably includes appropriate current unbalance sensers 61 responsive to a serious unbalance condition between the lines 22, 24. Also, one or more of the capacitor racks, such as 20–F, includes thermally responsive switch means 26–1, 26–2. As will be subsequently discussed, the outputs 66–1, 66–2 of the current unbalance senser and 26–1 and 26–2 of the thermal device are operatively interconnected to the protective arrangement for removing the capacitor bank from line 10–10' under such conditions which may not have resulted in operation of the spark gap 30. Spark gap 30 may be of the general type discussed in aforementioned patent application (C–1116 SWGR) Serial No. 234,770 and includes main gap 31, precision gap 32, resistors 33 and capacitors 34 to provide rapidly triggered and accurate break-down line 10–10'.

A suitable tap-off device 12 is provided along the line 10–10' to provide a current flow through series path 14 proportionally related to line load. Circuit 14 includes output terminals 16, 18 which supply the input signal 352 to the fast acting overload release circuitry of the instant invention generally shown as 350. Circuit 14 is also shown as including a number of time delayed relays 304–1, 304–2, 304–3, appropriately designed to pick up responsive to the existence of predetermined moderate overload conditions for prolonged periods of time.

The solenoid actuating circuits of fast acting protective system switches 100, 200, 300 are generally shown as 100–sc, 200–sc and 300–sc, respectively. These circuits are parallel connected to potential source 110, 111, via auto transformer 116. The control voltage available from the output of auto transformer 116 is presented to rectifying and voltage stabilizing circuitry of each of the solenoid actuating circuits to provide a constant source of D.C. potential. This circuitry includes bridge rectifier 120, capacitor 121, zener diode 122 and resistor 123, as shown in the input of circuit 100–sc. Similarly, components 220–223 and 320–323 are shown included in circuits 200–sc and 200–sc. The potential source terminals 110, 111 are also presented to a control circuit arrangement generally shown as 400, which as will be subsequently discussed is operatively associated with the solenoid control circuits of the protective switching arrangement to afford capacitance bank protection responsive to a variety of system abnormalities.

Responsive to an excessive voltage condition above a certain predetermined level, spark gap device 30 will rapidly fire, striking an arc therebetween to shunt remove capacitor bank 20 from the line. The flow of arc current is sensed by 35, thereby actuating relay solenoid 36–s. This causes the closing of contact 36–1, located in the disconnects switch actuating circuitry 100–sc. The closing of contacts 36–1 completes the actuating circuit for solenoid 100–s through the normally closed auxiliary contacts 100–3. Fast acting disconnect switch 100 is then closed to extinguish the arc by diverting current through bypass path 50. The closing of disconnect switch 100 also serves to close auxiliary contacts 100–1, 100–2 and open auxiliary contact 100–3. Disconnect switch 100 may also include other auxiliary contacts (not shown) to initiate the spring motor charging of its operating spring, and provide interphase signalling.

The closing of contacts 100–2 provides an energizing path for interrupter solenoid 200–s through normally closed auxiliary contact 200–1, and terminals 360, 362 of fast acting overload release 350. As will be subsequently discussed in conjunction with the circuitry of 350, terminals 360, 362 are operatively related to line condition to be rapidly closed upon the clearing up of the fault condition. Upon such closing of terminals 360, 362, solenoid 200–s will be energized. Fast acting interrupter switch 200 is then opened, serving to reinsert capacitor bank 20 in series relationship with the transmission line 10–10'.

As discussed in aforementioned patent applications Serial No. 259,233 and Serial No. 259,238, overload fast release relay 350 is time coordinated with the removal of the fault on the line to preferably provide capacitor bank reinsertion within ten cycles from the initial occurrence of the fault condition.

Referring again to FIGURE 2 the operation of other aspects of the overall control system will now be considered.

The actuation of arc current sensing relay 36–s and the closing of its associated contacts 36–2 energize relay 85, thereby closing its contacts 85–1. Contacts 85–1 are in series circuit relationship with air valve actuating solenoid 84–s and normally opened auxiliary contacts 100–1, the latter being closed by the closing of bypass disconnect switch 100. Thus, upon picking up of relay 85 and the closing of bypass disconnect switch 100, air valve solenoid 84–s will be actuated to provide a puff of air into the main spark gap 30 for cleaning away the ionized gases (schematically shown in FIGURE 1). The pickup of relay 85 and the energization of air valve solenoid 84–s are appropriately time related such that the puff of air will be emitted into the spark gap subsequent to arc extinguishment by the closing of disconnect switch 100, but prior to the opening of interrupter switch 200.

The pickup of any of the moderate overload sensing relays 304–1s, 304–2s or 305–3s closes its associated contact 304–1, 304–2 or 304–3 located in the general control circuitry shown as 400. The closing of any of such contacts energizes one of its associated time delayed relays 305–15, 305–25 or 305–35, closing associated contacts of the latter 305–1, 305–2 or 305–3 responsive to the moderate overload condition existing for predetermined time intervals. Contacts 305–1, 305–2 and 305–3 are in parallel relationship with respect to the contacts 26–1, 26–2, controlled by the output of the thermal device located within the capacitor bank. Hence, the existence of any one of a plurality of predetermined moderate overload conditions for a continuous interval, or of an excessive temperature condition within the capacitor bank 20 serves to energize relay coil 306 in series relationship with respect to the aforesaid parallel arrangement of contacts. The energization of relay 306 will close its contacts 306–1, 306–2, located in the general circuitry of 100–sc, and 302, respectively.

Contact 306–1 is in series relationship with actuating solenoid 100–s, through auxiliary contact 300–2 (closed when lockout switch 300 is in its normally opened position) and auxiliary contacts 100–3 (closed when disconnect switch 100 is in its normally open position). Thus it is seen that the actuation of coil 306 responsive to the aforedescribed moderate overload or capacitor bank thermal conditions will serve to actuate bypass disconnect switch 100 providing that lockout switch 300 has not been closed and switch 100 has not already been actuated responsive to arc current.

Contact 306–2 is similarly in series relationship with actuating solenoid 300–s of the lockout switch through series connected contacts 300–1 (closed when lockout switch 300 is in its normally open position), 200–2 (closed when interrupter 200 has been operated to its opened position). Thus, the actuation of relay 306 will alternately actuate lockout switch 300 to close auxiliary bypass circuit 60 should the circuit fault condition occur subsequent to the sequential operation of switches 100 and 200, and before they have been reset to their original positions.

Lockout switch 300 may alternatively be energized by the closing of contacts 86–1 or 87–1. The closing of contacts 86–1 is governed by the operation of time delay relay 86 in the circuit of arc current sensing contact 36–2. Thus, current flow through the spark gap for an extended length of time will serve to close lockout switch 300, via time delay relay switch 86. Contacts 87–1 are closed by the actuation of relay 87. Relay 87 is in series relationship with contacts 61–1, 61–2 of the capacitor bank current unbalance sensers, and will be actuated responsive to a predetermined unbalance condition.

*Fast acting overload release*

Proper timing for the actuation of bypass interrupter 200 is provided by a novel circuit arrangement generally designated as 350, the circuit of which is shown in FIGURE 2A and which is the subject of aforementioned patent application Serial No. 259,233. The input signal 352 at terminals 16, 18 is generally sinusoidal and proportional in magnitude to line load. To appropriately relate the input signal magnitude to the circuit parameter, the signal is applied to adjustable resistor R1, connected to the input terminals of amplifying transformer T1. The signal is then presented to a full wave rectifier circuit comprising the bridged arrangement of the diodes D1–D4. The full wave rectifier output signal of the diode bridge is then applied to zener diode Z–1. Zener diode Z–1 is selected to break down and become conducting when the rectifier output signal presented thereto has a magnitude representative of a line overload condition. Breakdown of zener diode Z–1 applies a gating signal to SCR–1, the circuit of which is completed through R–5, R–6 and R–7 at a time subsequent to the closing of the disconnect switch auxiliary contacts 100–2.

The circuit of SCR–1 is designed such that it will not fire unless Z–1 breaks down to apply a gating signal thereto. Thus SCR–1 will fire during the time an overload condition is sensed by the lefthand portion of the circuit as shown in FIGURE 2A. Further, the circuit parameters of SCR–1 are carefully chosen such that it will cease conducting every half cycle each time the signal to its gate passes through zero. Accordingly, SCR–1 fires at half cycle intervals subsequent to the closing of the disconnect switch 100 and only while the fault condition remains.

Closing of auxiliary contacts 100–2 of the bypass disconnect switch causes an energy storage device, such as capacitor C–1 to be charged towards source potential through the series arrangement of resistors R–6 and R–7. The parameters of capacitor C–1, R–6 and R–7 are chosen in conjunction with the magnitude of the control system source potential such that it will take approximately ¾ of a cycle for capacitor C–1 to reach a potential corresponding to the breakdown potential of zener diode Z–5. Also, the firing of SCR–1 by the overload responsive signal gate 48 is sequentially related to the charging cycle of C–1 such that SCR–1 fires before C–1 will reach the breakdown potential of zener diode Z–5. The firing of SCR–1 provides a low impedance shunt path across capacitor C–1, thereby discharging the capacitor and preventing it from reaching a voltage sufficient to fire zener diode Z–5.

Upon clearing up of the fault SCR–1 will cease firing, permitting C–1 to reach a potential sufficient to cause zener diode Z–5 to break down and become conducting. Since the charging of capacitor C–1 is no longer interrupted by the firing of SCR–1, the capacitor continues to charge until the breakdown voltage of zener diode Z–5 is reached. This will occur within a maximum period of ¾ of a cycle from fault removal resulting in a gating signal to be applied to an appropriate solid state switch, such as SCR–2. SCR–2 will then fire and become conducting to provide a low impedance path between output terminals 360, 362. The effective closing of the circuit between terminals 360, 362 will then permit sufficient current flow in circuit 200–sc to actuate the interrupter switch for restoration of the capacitor bank within approximately ¾ of a cycle from the clearing up of the fault condition. A ¾ cycle timing arrangement is preferably provided in the above described half-cycle peak current scan arrangement to provide a safety factor between the sequential operation of the overload responsive and timing sections.

Variable resistors R–1 and R–10 are preferably provided to serve as coarse and fine adjustments respectively, to correlate the input signal magnitude at 16–18 to the individual characteristics of Z–1 and SCR–1. Small zener diodes Z–2, Z–3 are provided for the protection of SCR–1 in the event of an excessively large gate signal. Resistor R–4 is provided to stabilize the operation of SCR–1. Similarly, resistor R–9 and capacitor C–2 are provided to stabilize the operation of SCR–2. Zener reference diode Z–4 is provided across R–6 and C–1 to maintain a constant time delay during periods of supply voltage fluctuation. A high magnitude resistor R–8 is applied across capacitor C–1 to discharge any partial charge remaining on the capacitor.

*Control system voltage source*

It should now be evident that the proper operation of the control system as described above requires an auxiliary voltage source of a substantially constant magnitude at terminals 110, 111. That is, the sequential operation of the various relays (particularly overload release relay 350), for optimum system performance depends upon such a constant magnitude being maintained at all times. For example, the auxiliary voltage source should be maintained within a maximum range of 70–140 volts corresponding to a line load variation between 100 and 6,000 amperes; such variations occurring during: normal transmission conditions with capacitor bank 20 being series inserted in line 10, 10'; the occurrence of a fault condition with the capacitor bank being protectively removed from transmission line 10–10'; and reinsertion of the capacitor bank upon clearing up of the fault condition.

Figure 3:
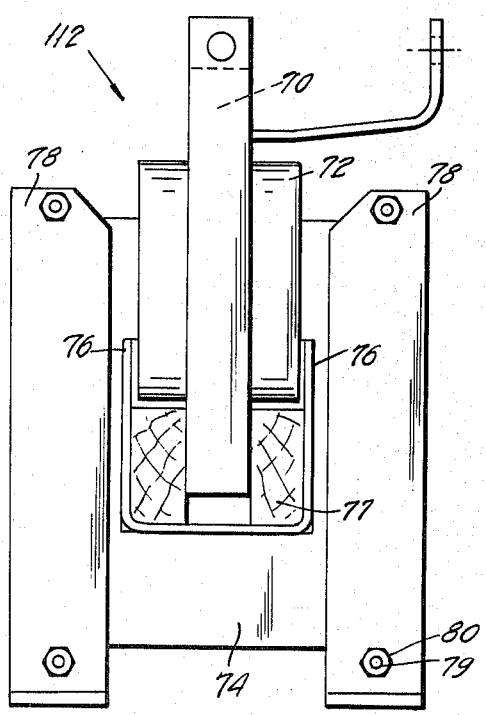
FIGURES 3 and 3A are front and end views respectively of the coil and core arrangement of a saturable core current transformer constructed to carry out the teachings of our invention.
Figure 3A:
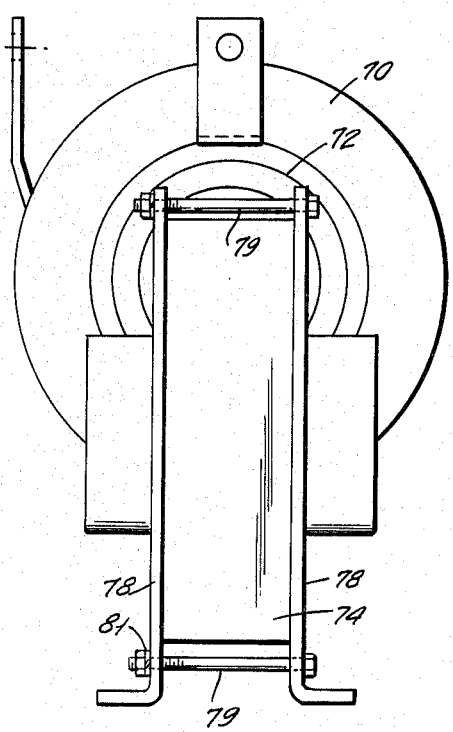

Our invention advantageously provides such a control voltage source potential by a novel arrangement, of a saturable core current transformer 112 and low pass filter 114 (generally shown in FIGURE 2). The core and windings of transformer 112 are contained in an appropriate housing (not shown) which may also include protective lightning arrestors 113. Referring to FIGURES 3 and 3a primary and secondary coils 70, 72, respectively, are shown positioned about core 74. Core 74 is appropriately designed to saturate when primary coil 70 is subject to a low level of line current (i.e. 50 amperes) as by its tap-off from line 10, 10'; press board 77 and hardwood block 76 is provided for electrical insulation. The core and coil assembly is maintained between end clamping brackets 78 by bolt, washer and lock washer assemblies 79–81, respectively. Core 74 is accordingly housed to provide sufficient cooling during the occurrence of high flux densities.

Referring again to FIGURE 2, the output terminals 90, 91 of saturable core current transformer 112 are presented to a low pass filter circuit, generally designated as 114 and including resistors 92, 93; inductors 94, 95; and capacitors 96, 97. This circuit is designed to filter out the higher frequency components of the current transformer output wave form, thereby providing a substantially sinusoidal 60 cycle signal at output terminals 110, 111. As a further advantageous function of the circuitry generally shown as 114, the components are temperature compensated to maintain a substantially constant magnitude at terminals 110, 111 under the combined effects of line load variations between 100 to 6,000 amperes and ambient temperature changes between −40 and +40 centigrade.

Curve 101 of FIGURE 4 graphically shows the manner in which our invention advantageously limits the output voltage 98 variation corresponding to an appreciable line load variation 99, as for example between 100 and 6,000 amperes. The abscissa 99 which is representative of load, is logarithmically represented to permit a more convenient representation.

It is therefore seen that our invention provides a substantially constant voltage source for the operation of the control circuitry of a series capacitor bank installation, wherein the energy is derived from the main line under all conditions of variable load, and all the equipment can be maintained on a platform or at the same level as the high voltage capacitor bank and protective equipment. Such a control system is substantially more simplified and economical than either: compressed air arc extinguishment; the use of a separate source at ground level; or a potential transformer tap off from the main line, as heretofore practiced.

Although we have described preferred embodiments of our novel invention, many variations and modifications will now be obvious to those skilled in the art, and we prefer therefore to be limited not by the specific disclosure herein but only by the appended claims.

We claim:
1. In combination:
an alternating current transmission line having a substantially varying line current;
a capacitor arrangement in electrical series with said transmission line for compensating for inductive reactance in said transmission line;
electrically operated circuit means for establishing a by-pass current path which shunts out said capacitor arrangement in response to predetermined circuit conditions; and
an electrical source adapted to obtain a comparatively constant potential from the substantially varying line current of said transmission line for the operation of said circuit means, said electrical source comprising;
a current transformer including a primary winding energized by said line current, a core means saturable by a low level of said line current, and a secondary winding electrically connected to said circuit means, said secondary winding presenting an output potential having a maximum variation in magnitude within a 1:2 ratio corresponding to a variation in transmission line current of up to at least 1:50.

2. The combination of claim 1, wherein the output potential of said transformer has a maximum variation in magnitude within 70 to 140 volts corresponding to a variation in said line current within the range of 100 to 6000 amperes.

3. The combination of claim 2, and further including a low pass filter circuit including an input and output; the output potential of said current transformer presented to said low pass filter circuit, thereby providing a substantially sinusoidal waveform at said low pass filter output within the range of variation of said line current.

4. The combination of claim 3, wherein said filter circuit includes a low impedance resistor in parallel with said output in order to maintain the load appearing at said output at a relatively constant value.

5. In combination:
an alternating current transmission line having a substantially varying line current;
a capacitor arrangement in electrical series with said transmission line for compensating for inductive reactance in said transmission line;
electrically operated first circuit means for establishing a by-pass current path which shunts out said capacitor arrangement in response to predetermined circuit conditions;
electrically operated second circuit means for reinserting said capacitor arrangement in electrical series with said transmission line subsequent to operation of said first circuit means; and
an electrical source adapted to obtain a comparatively constant potential from the substantially varying line current of said transmission line for the operation of said first and second circuit means, said electrical source comprising;
a current transformer including a primary winding energized by said line current, a core means satur-
able by a low level of said line current, and a secondary winding electrically connected to said first and second circuit means, said secondary winding presenting an output potential having a maximum variation in magnitude within a 1:2 ratio corresponding to a variation in transmission line current of up to at least 1:50.

6. The combination of claim 5, wherein the output potential of said transformer has a maximum variation in magnitude within 70 to 140 volts corresponding to a variation in said line current within the range of 100 to 6,000 amperes, and further including a low pass filter circuit including an input and output; the output potential of said current transformer presented to said low pass filter circuit thereby providing a substantially sinusoidal waveform at said low pass filter output within the range of variation of said line current.

7. In combination:
an alternating current transmission line having a substantially varying line current;
a capacitor arrangement in electrical series with said transmission line for compensating for inductive reactance in said transmission line;
electrically operated first circuit means for establishing a by-pass current path which shunts out said capacitor arrangement in response to predetermined instantaneous fault conditions on said line;
electrically operated second circuit means for establishing a bypass current path which shunts out said capacitor arrangement in response to predetermined time-delayed overload conditions on said line;
electrically operated third circuit means for establishing a by-pass current path which shunts out said capacitor arrangement in response to predetermined unbalanced voltage conditions in said capacitor arrangement; and
an electrical source adapted to obtain a comparatively constant potential from the substantially varying line current of said transmission line for the operation of said first, second and third circuit means, said electrical source comprising;
a current transformer including a primary winding energized by said line current, a core means saturable by a low level of said line current, and a secondary winding electrically connected to said first, second and third circuit means, said secondary winding presenting an output potential having a maximum variation in magnitude within a 1:2 ratio corresponding to a variation in transmission line current of up to at least 1:50.

References Cited by the Examiner
UNITED STATES PATENTS 1,679,434   8/1928   McCurdy _____ 307—105 X
2,664,525   12/1953  Diebold _____ 317—12

SAMUEL BERNSTEIN, *Primary Examiner.*
R. V. LUPO, *Assistant Examiner.*